United States Patent
Lagorgette et al.

(10) Patent No.: US 12,222,685 B2
(45) Date of Patent: Feb. 11, 2025

(54) WATCH CONFIGURED TO PERFORM CONTACTLESS ELECTRONIC TRANSACTIONS

(71) Applicant: ETA SA Manufacture Horlogère Suisse, Grenchen (CH)

(72) Inventors: Pascal Lagorgette, Bienne (CH); Xavier Stehlin, Cudrefin (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 380 days.

(21) Appl. No.: 17/724,694

(22) Filed: Apr. 20, 2022

(65) Prior Publication Data

US 2022/0373979 A1   Nov. 24, 2022

(30) Foreign Application Priority Data

May 21, 2021   (EP) .................................... 21175259

(51) Int. Cl.
| | |
|---|---|
| *G04R 60/12* | (2013.01) |
| *G04G 17/04* | (2006.01) |
| *G04G 21/04* | (2013.01) |
| *G06Q 20/32* | (2012.01) |
| *H01Q 1/22* | (2006.01) |
| *H01Q 1/27* | (2006.01) |

(52) U.S. Cl.
CPC ............ *G04R 60/12* (2013.01); *G04G 17/04* (2013.01); *G04G 21/04* (2013.01); *G06Q 20/321* (2020.05); *G06Q 20/3278* (2013.01); *H01Q 1/2291* (2013.01); *H01Q 1/273* (2013.01)

(58) Field of Classification Search
CPC ........ G04R 60/12; G04R 60/06; G04R 20/26; G04G 17/04; G04G 21/04; G04G 9/0064; G04G 17/06; G04G 17/08; G06Q 20/321; G06Q 20/3278; H01Q 1/2291; H01Q 1/273; G04B 47/00
See application file for complete search history.

(56) References Cited

U.S. PATENT DOCUMENTS

| | | | | |
|---|---|---|---|---|
| 5,159,713 A | * | 10/1992 | Gaskill | G04G 21/04 455/344 |
| 5,886,669 A | * | 3/1999 | Kita | H01Q 1/273 343/718 |

(Continued)

FOREIGN PATENT DOCUMENTS

| | | |
|---|---|---|
| CN | 107219756 A | 9/2017 |
| CN | 210742693 U | 6/2020 |

(Continued)

OTHER PUBLICATIONS

European Search Report for EP 21 17 5259 dated Sep. 21, 2021.
Office Action issued Mar. 1, 2024 in Chinese Application No. 202210548391.5.

*Primary Examiner* — Edwin A. Leon
(74) *Attorney, Agent, or Firm* — Sughrue Mion, PLLC

(57) ABSTRACT

A watch is includes a case including at least one pair of horns, a horological movement, and a near field communication module configured to perform contactless electronic transactions. The near field communication module may be connected to the horological movement by being arranged between horns of the at least one pair of horns.

12 Claims, 3 Drawing Sheets

(56) References Cited

U.S. PATENT DOCUMENTS

| | | | |
|---|---|---|---|
| 2016/0006472 A1* | 1/2016 | Iriyama | H01Q 1/48 455/575.6 |
| 2016/0141746 A1* | 5/2016 | Kim | H01Q 1/273 343/718 |
| 2017/0179580 A1 | 6/2017 | Park et al. | |
| 2018/0059621 A1 | 3/2018 | Singh | |
| 2018/0294553 A1 | 10/2018 | Lim et al. | |

FOREIGN PATENT DOCUMENTS

| | | |
|---|---|---|
| CN | 218938791 U | 4/2023 |
| EP | 3 021 177 A1 | 5/2016 |
| EP | 3 182 221 A1 | 6/2017 |
| EP | 3 454 413 A1 | 3/2019 |
| WO | 2019/007116 A1 | 1/2019 |

\* cited by examiner

WATCH CONFIGURED TO PERFORM CONTACTLESS ELECTRONIC TRANSACTIONS

CROSS REFERENCE TO RELATED APPLICATION

This application claims priority to European Patent Application No. 21175259.7 filed May 21, 2021, the entire contents of which are incorporated herein by reference.

TECHNICAL FIELD OF THE INVENTION

The present invention relates to the technical field of watches. The invention relates more particularly to a watch comprising a near field communication module participating in performing contactless electronic transactions.

The invention also relates to a system for performing contactless electronic transactions comprising such a watch.

TECHNOLOGICAL BACKGROUND

It is known to produce portable objects incorporating near field communication modules, for example using a radiofrequency tag. These modules consist of an electronic chip, or integrated circuit, electrically connected to an antenna. Most of the time, these modules do not need an autonomous power supply and are intended to communicate automatically with a reader as soon as they approach it. The electromagnetic field of the reader generates an induced current in the antenna which power supplies the chip and allows it to in turn emit a signal via the antenna.

Such devices are commonly found in integrated circuit cards which allow contactless payments to be made at the terminals provided for this purpose. Also known are applications EP 603 721, EP 974 878, CH 690 525 or CH 704 583 which describe watches including near field communication modules wherein the antennas of these modules are concealed in different locations of the watch such as the dial, the middle part, the bezel, the gasket of the crystal or the crystal. Other configurations provide to house the antenna in the back, the movement or else the bracelet.

However, the integration of these contactless communication modules into a watch is often problematic because the watch comprises a case with an enclosure having a restricted reception volume. In addition, such a case conventionally comprises many metal parts making it difficult to optimally position the antenna in its enclosure.

It is understood that there is a need to find a solution, in particular which does not have the disadvantages of the prior art.

SUMMARY OF THE INVENTION

The purpose of the invention is to overcome these disadvantages by proposing a watch comprising a near field communication module which is able to send/receive an entire signal and at full power while being arranged in the case of this watch whose enclosure has a limited reception volume.

For this purpose, the invention relates to a watch provided with a case comprising at least one pair of horns, a horological movement and a near field communication module configured to perform contactless electronic transactions, said communication module being connected to the movement by being arranged between the horns of said at least one pair of horns.

In other embodiments:
the case comprises a middle part provided with a through opening comprised between the horns of said at least one pair of horns, said opening being configured to receive all or part of the communication module;
said communication module comprises a support element capable of closing off said opening;
the communication module comprises a support element including a chip, at least one antenna and a connector intended to be electrically connected to a microcontroller of the horological movement;
the communication module comprises a substrate fixed to an internal face of a support element, said substrate comprising a chip, at least one antenna and one connector;
the support element is made of at least one dielectric and/or electrically non-conductive material;
said horological movement comprises a microcontroller configured to participate in performing contactless electronic transactions;
said communication module is removably connected to said horological movement;
the contactless electronic transactions are contactless electronic payments and/or contactless electronic authentications/identifications of the wearer of the watch.

The invention also relates to a system for performing contactless electronic transactions between a watch and a transactional device provided with a near field communication element and a microcontroller configured to control said element, the watch comprising a near field communication module and a microcontroller configured to exchange electrical signals with this module, said watch and said device being configured to be connected in near field to each other for performing said electronic transactions.

DETAILED DESCRIPTION OF THE INVENTION

In FIGS. 1 to 5 is shown a watch 2 such as an electronic quartz watch or a mechanical watch. It is recalled here that a mechanical watch is a watch whose movement is mechanical and whose energy is supplied by a spring wound in a barrel. For a better understanding of the invention, in the present embodiment, such a watch 2 is preferably an electronic watch 2. This electronic watch 2 is provided for performing contactless electronic transactions such as transactions related to contactless electronic payments and/or contactless electronic authentications/identifications of the wearer of this watch 2.

In other words, such a watch 2 is capable of participating in the implementation of a method for performing contactless electronic transactions such as, in a non-limiting and non-exhaustive manner, an electronic payment method and/or a method for authenticating/identifying the wearer of this watch 2 and/or a method for controlling access to a dwelling/building or to equipment/machine. Such methods, the operation of which is well known from the prior art will not be described in more detail.

Figure 1:
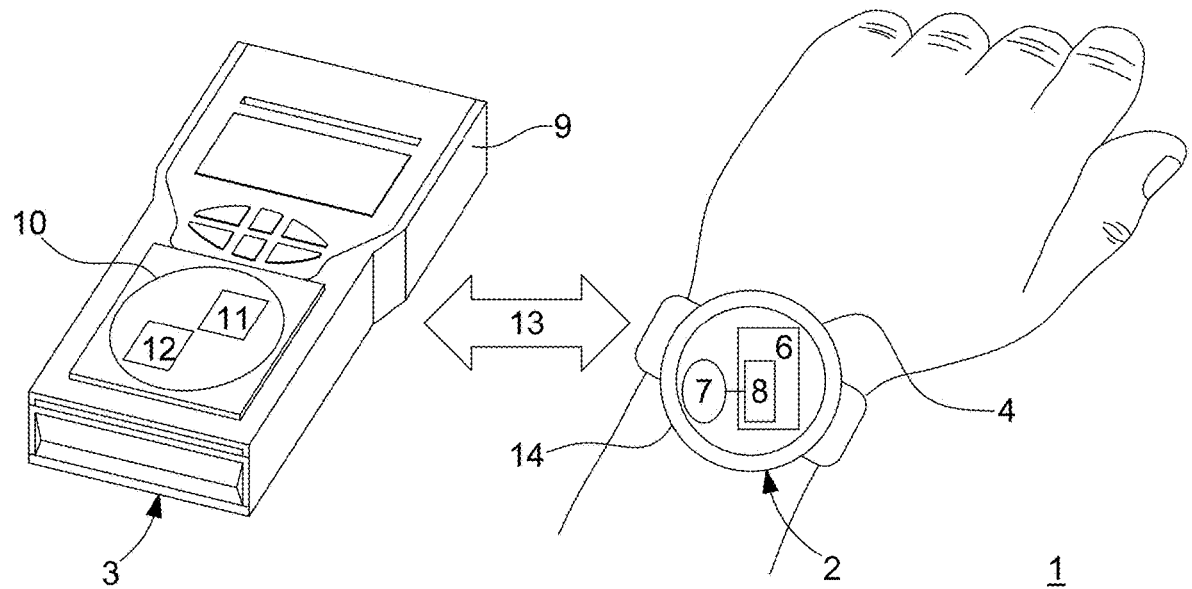
FIG. 1 is a schematic representation of a system for performing contactless electronic transactions between a watch and a transactional device, according to one embodiment of the invention.

Such a method is implemented by an innovative system 1 for performing contactless electronic transactions shown in FIG. 1. Such a system 1 therefore comprises a transactional device 3 as well as said watch 2, the two 2, 3 being capable of performing data exchanges 13 therebetween by implementing a near field communication technology.

In this context, the watch 2 then comprises in a non-limiting and non-exhaustive manner:
- a case 4 which is provided with at least one pair of horns 5;
- a near field communication module 7;
- a horological movement 6 such as an electronic movement comprising a microcontroller 8 configured to exchange electrical signals with the communication module 7 in the near field;
- a bracelet mounted on the case 4;
- an analogue and/or digital display therefore comprising hands, in particular three display hands;
- an input interface such as a touch screen or else push buttons, a crown, etc.
- a power supply unit such as a cell or a battery/accumulator allowing to power supply the horological movement 6 and in particular the microcontroller 8 connected to the communication module 7.

Figure 2:
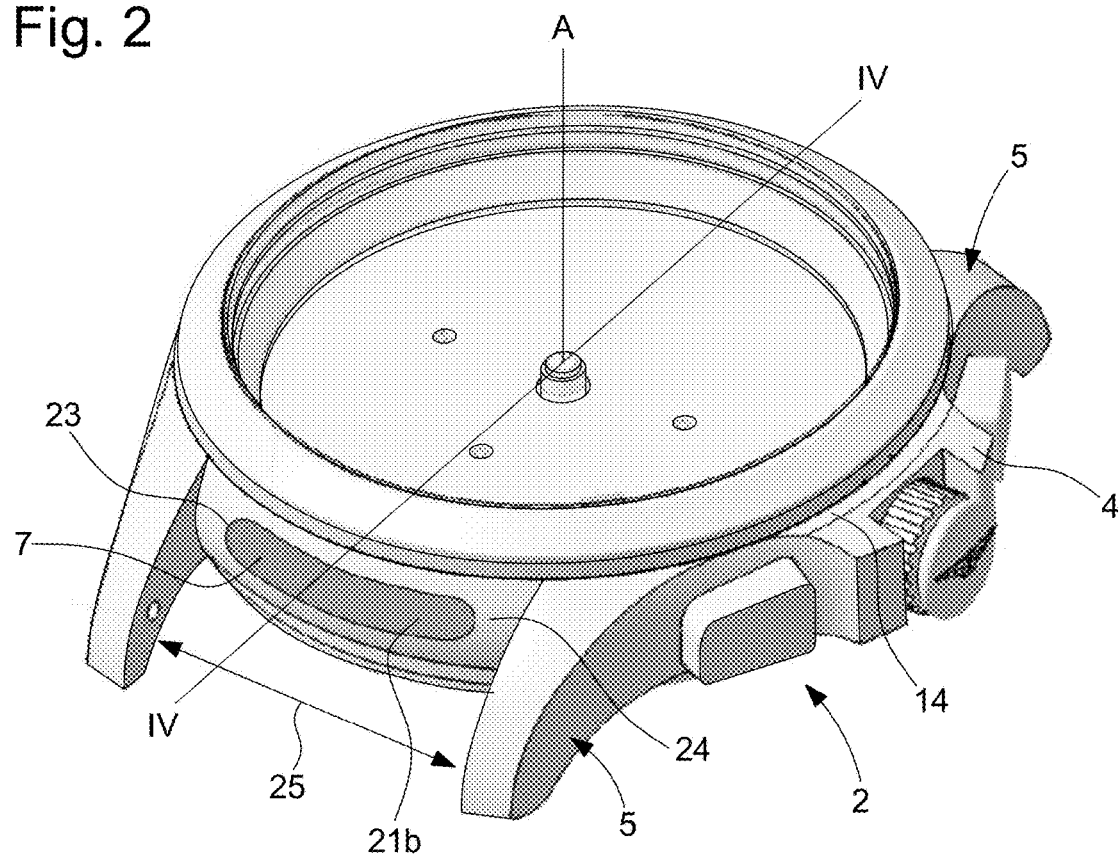
FIG. 2 is a perspective view of said watch comprising a case provided with two pairs of horns, said case comprising a near field communication module arranged between the horns of one of its two pairs, according to the embodiment of the invention.

In FIGS. 1 and 2, the case 4 includes a middle part 14 which can be made of metal (for example steel, preferably stainless steel), of a synthetic (for example made of a composite material comprising a polymer matrix filled with fibres, typically carbon) or ceramic material. The case 4 also comprises a back and a crystal which participate in forming with the middle part 14, an enclosure of this case 4. Such an enclosure is configured to accommodate in particular the horological movement 6 comprising the microcontroller 8 and the near field communication module 7. In FIG. 1, this middle part 14 comprises two pairs of horns 5 on which a bracelet is intended to be attached for wearing the watch 2 on the wrist.

Such a bracelet is preferably made of at least one dielectric and/or electrically non-conductive material such as for example a synthetic (for example a composite material comprising a polymer matrix filled with fibres, typically carbon) or ceramic or else plastic material such as high-performance plastic. It will be noted that when the bracelet is formed of links, the links which are directly fixed to the pairs of horns 5 are made of at least one dielectric and/or electrically non-conductive material, the other links can be made of other diverse and various materials. In this embodiment, the pairs of horns 5 are connected to an elastomer bracelet that matches the shape of the middle part 14 to completely hide an external face 21b of a support element 15 of the communication module 7 that will be described later.

The middle part 14 also comprises a through opening 23 arranged between the horns of one of the two pairs of horns 5. This opening 23 is therefore located in the space between the horns 25 defined in the pair of horns 5 located at 6 o'clock of the watch 2, but it can also be positioned in the space between the horns 25 of the pair of horns 5 located at 12 o'clock. This opening 23 is configured to be traversed by all or part of a body of a support element 15 of the communication module 7. Furthermore, it will be noted that if the pairs of horns 5 are disregarded, the middle part 14 has a general symmetry of revolution around a central axis A of the case 4.

In the horological movement 6, the microcontroller 8 of this watch 2 is capable of controlling the process implementing the performance of a contactless electronic transaction.

In the case 4 of this watch 2, the near field communication module 7 is connected to the movement 6 by being arranged between the horns of said at least one pair of horns 5. Such a communication module 7 allows said watch 2 to be able to perform a two-way communication with the portable/mobile or fixed electronic device 3.

More specifically, this communication module 7 is connected to the microcontroller 8 of this movement 6. In this configuration, the near field communication module 7 is connected/removably connected to the movement and therefore to the microcontroller 8.

Such a near field communication module 7 implements, for example, short-range and high-frequency wireless communication technologies of the NFC type (acronym for "Near Field Communication"). This communication module 7 operates according to technologies which are different from RFID and Bluetooth. This communication module 7 can for example operate in the frequency bands relating to high frequencies HF, for example at 13.56 MHz.

The communication module 7 thus allows to perform a data exchange 13 at short distances between the watch 2 and the electronic device 3. Such distances can be comprised between approximately 0 and 10 cm, and preferably between 0 and 5 cm. It will be noted that when this watch 2 is a mechanical watch, the communication module 7 can be of the passive type with a power supplied thereto by the radio frequencies emitted by the communication element 12 of the electronic device 3. Alternatively, the communication module 7 of the watch 2 can be of the active type with a power supplied thereto by the power supply unit of the watch 2.

Figure 3:
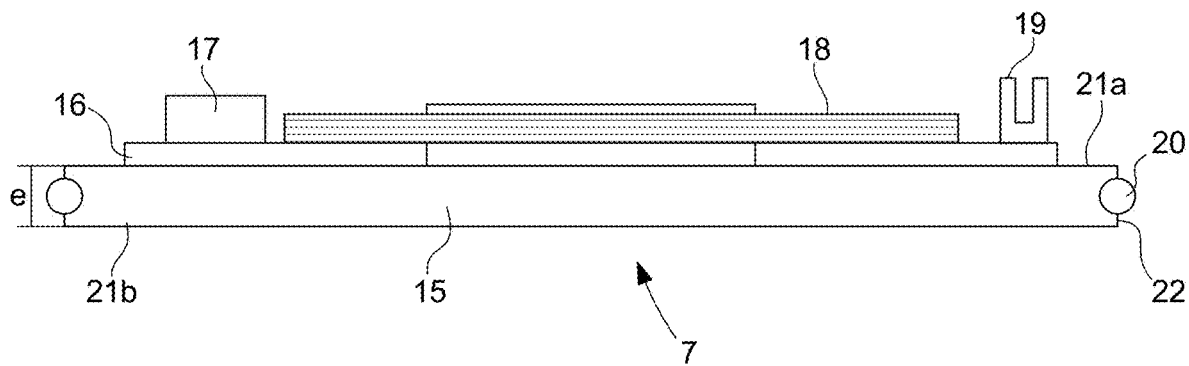
FIG. 3 is a schematic representation of the near field communication module which is capable of participating in performing contactless electronic transactions, according to the embodiment of the invention.
Figure 4:
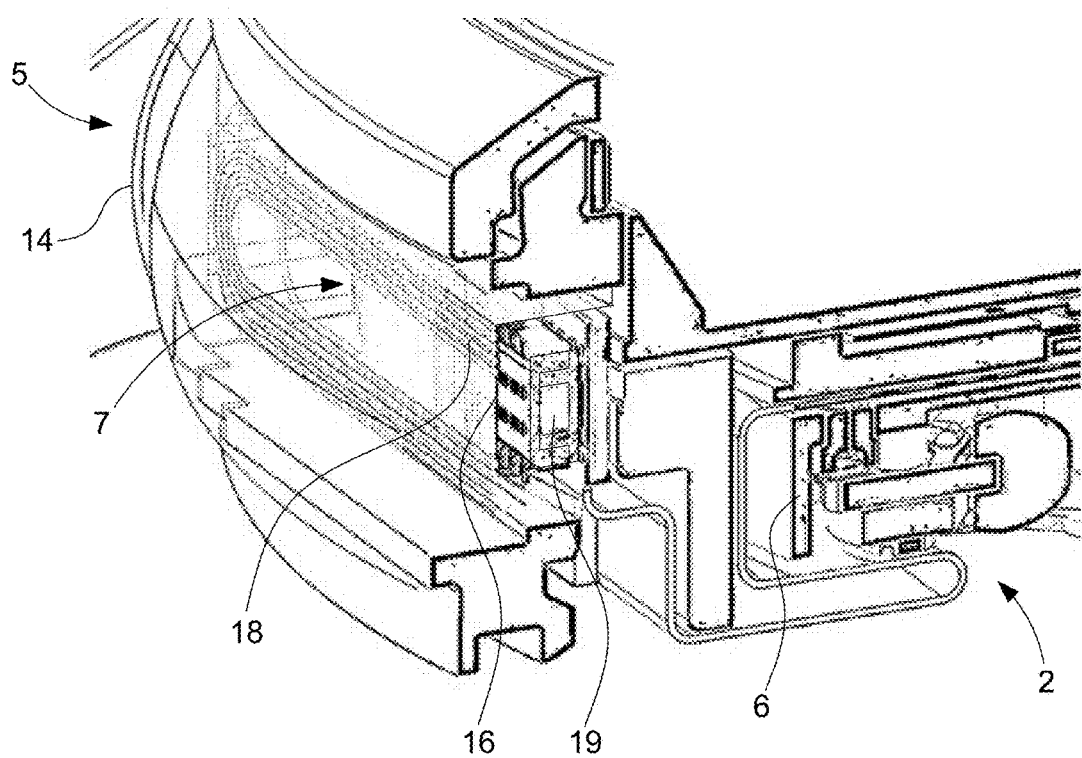
FIGS. 4 and 5 are partial sectional views along the axis IV-IV of FIG. 2 which are presented respectively from two different angles of a portion of the case wherein the communication module is arranged according to the embodiment of the invention.
Figure 5:
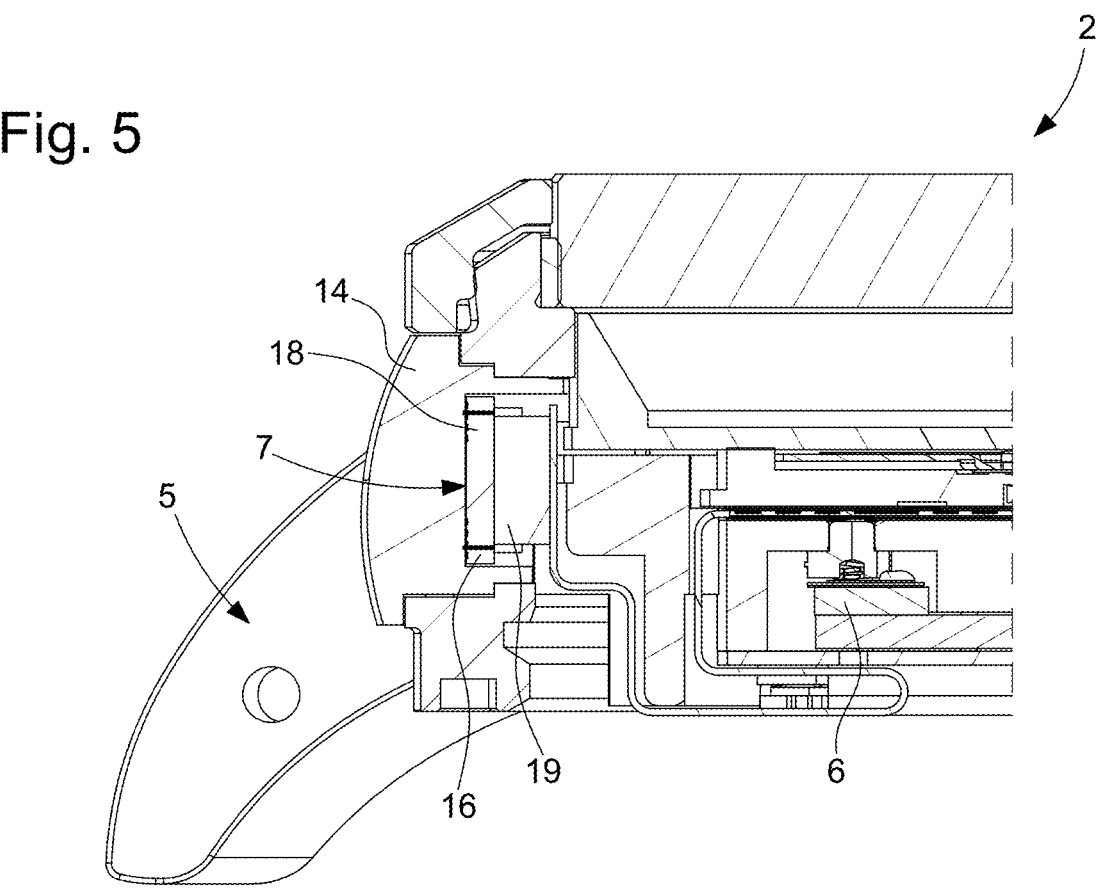

More specifically and with reference to FIG. 3, the near field communication module 7 comprises an electronic chip 17, at least one antenna 18 and a connector 19 allowing to connect said module 7 to the microcontroller 8. The chip 17 which is connected to said at least one antenna 18, comprises hardware and software elements. In this context, the hardware and/or software elements of the chip 17 include at least one microprocessor cooperating with memory elements. The communication module 7 also comprises a substrate 16 which is advantageously made in the form of a printed circuit. Such a substrate 16 also called "support" or "plate" is preferably made of high-performance plastic material or laminated composites. This plastic material can be a polymer such as polyimide known as Kapton™ or else a polyester. The chip 17 and said at least one antenna 18 as well as the connector 19 are fixed for example by gluing on this substrate 16.

In this communication module 7, the substrate 16 is fixed on an internal face 21a of the support element 15 mentioned above. In other words, this support element 15 comprises the substrate 16 and of course all the other components forming the communication module 7. This support element 15 has a shape essentially similar to that of the opening 23 comprised in the middle part 14 or strictly similar to that of this opening 23. Such an element 15 therefore comprises the internal face 21a and an external face 21b, these two faces 21a, 21b being connected by a peripheral wall 22. Such a peripheral wall 22 comprises a cavity extending over the entire length of this wall 22 so as to participate in defining the outline of this support element 15. This wall 22 also comprises a sealing element 20 with the middle part 14 to prevent any ingress of liquid such as an O-ring which is arranged in said cavity. Thus, the support element 15 therefore closes off this opening 23 of the middle part 14 and can for this purpose also be called "closing element".

This support element 15 has a thickness e which corresponds to the height or the width of this peripheral wall 22. This thickness e is substantially similar or strictly similar to the thickness of the portion of the middle part 14 comprising said opening 23. In other words, the opening 23 comprises an internal wall delimiting/defining the shape of this opening 23 and whose thickness is substantially similar or strictly similar to the thickness e of the peripheral wall 22 of the support element 15.

This support element 15 is preferably made of at least one dielectric and/or electrically non-conductive material. It can be a synthetic (for example made of a composite material comprising a polymer matrix filled with fibres, typically carbon) or ceramic or plastic material such as high-performance plastic. It will be noted that the external face 21b of this support element 15 can be of the same colour as the external face 24 of the middle part 14 and can also have a texture substantially similar or strictly similar to this external face 24.

Furthermore, it will be noted that the arrangement described here of the communication module 7 between the two horns of a pair of horns 5 of the watch 2, contributes to improving the quality of the bidirectional near field communication signal likely to be received or emitted by this module 7.

Furthermore, in one embodiment, the communication module 7 of the watch 2 may comprise a magnetic shielding element (not shown) between the chip 17 and said at least one antenna 18 of this module 7, and the movement 6 of the watch 2. This magnetic shielding element allows to improve the efficiency and sensitivity of the reception/transmission of radio signals by the antenna 18 of the communication module 7 by isolating this antenna 18 from the metal components of the watch 2 comprised in its immediate environment. In other words, this magnetic shielding element allows to avoid a modification of the magnetic field emitted or received by the communication module 7, which modification would be due to the presence of various metal components of the watch 2 located in the immediate environment of the communication module 7. In addition, it is able to reduce the negative influence that these metal components may have on the performance of the communication module 7. This negative influence would consist of the attenuation of the magnetic field generated or received by this communication module 7.

In the system 1 shown in FIG. 1, the electronic device 3 may for example be a payment terminal when the communication module 7 is capable of performing contactless electronic payments. This electronic device 3 can also be a contactless reader when the communication module is capable of performing contactless electronic authentications/identifications of the wearer of the watch, for example in order to access:

to a secure dwelling/building/hall/room, etc.;
to a secure service such as a food service or a banking/financial service, etc.;
to the use of equipment/machines such as a coffee machine, a transport vehicle, etc.

Such an electronic device 3 may for example be a computer, a smartphone, a phablet or else a tablet. As already mentioned, this electronic device 3 is capable of cooperating with the watch 2 in order to perform electronic transactions. With reference to FIG. 1, this electronic device 3 comprises a case 9 wherein an electronic circuit 10 is arranged. This electronic circuit 10 includes a microcontroller 11 and a near field communication element 12, both 11, 12 power supplied by a battery. The electronic device 3 can also comprise a camera and an input interface such as a touch screen or else buttons.

It will be noted that the communication element 12 of this device 3 is configured to connect and exchange 13 data with the near field communication module 7 of the watch 2. Under these conditions, this communication element 12 and the communication module 7 are then capable of establishing a near field connection therebetween. It will be noted that such a communication establishment can provide for a phase of initiation, which is in particular automatic, of a connection between the watch 2 and the electronic device 3 as soon as this watch 2 is located relative to the electronic device 3 at a distance authorising establishment of a near field connection. It is understood that this initiation of the connection can be carried out manually or automatically. In the context of manual initiation, the connection process between the communication module 7 of the watch 2 and the communication element 12 can be carried out following an interaction, as the case may be, between the user and an input interface of the watch 2, or the user and an input interface of the electronic device 3. Once the connection has been established between the watch 2 and the electronic device 3, contactless electronic transactions can then be carried out.

It will be understood that various modifications and/or improvements and/or combinations obvious to the person skilled in the art can be made to the embodiment of the invention set out above without departing from the scope of the invention defined by the appended claims.

The invention claimed is:
1. A watch comprising:
a case comprising:
at least one pair of horns;
a horological movement;
a near field communication module configured to perform contactless electronic transactions; and
a middle part that includes a through opening between horns of the at least one pair of horns, the through opening configured to receive at least a part of the near field communication module,
wherein the near field communication module is connected to the horological movement and is between the horns of the at least one pair of horns, and
wherein the near field communication module comprises:
a support element that closes the through opening and comprises an external face that defines a portion of an exterior surface of the case;
at least one antenna on an internal face of the support element; and
an electronic chip on the internal face of the support element.
2. The watch according to claim 1, wherein the near field communication module further comprises a connector that is configured to be electrically connected to a microcontroller of the horological movement.

3. The watch according to claim 1, wherein the near field communication module further comprises a substrate on the internal face of the support element, and
wherein the electronic chip and the at least one antenna are on an internal face of the substrate.

4. The watch according to claim 1, wherein the support element is made of an electrically non-conductive material.

5. The watch according to claim 1, wherein the horological movement comprises a microcontroller configured to participate in performing contactless electronic transactions.

6. The watch according to claim 1, wherein the near field communication module is removably connected to the horological movement.

7. The watch according to claim 5, wherein the contactless electronic transactions are contactless electronic payments and/or contactless electronic authentications/identifications of a wearer of the watch.

8. A system comprising:
the watch according to claim 1; and
a transactional device comprising a near field communication element and a microcontroller configured to control the near field communication element,
wherein the watch further comprises a microcontroller configured to exchange electrical signals with the near field communication module, and
wherein the watch and the transactional device are configured to perform electronic transactions with each other via a near field connection.

9. The watch according to claim 3, wherein the substrate comprises a circuit.

10. The watch according to claim 1, wherein a thickness of the support element is the same as a thickness of a wall of the middle part that defines the through opening.

11. The watch according to claim 1, wherein the near field communication module further comprises a sealing element directly between a peripheral wall of the support element and a wall of the middle part that defines the through opening.

12. A watch comprising:
a case comprising:
at least one pair of horns;
a horological movement;
a near field communication module configured to perform contactless electronic transactions; and
a middle part that includes a through opening between horns of the at least one pair of horns, the through opening configured to receive at least a part of the near field communication module,
wherein the near field communication module is connected to the horological movement and is between the horns of the at least one pair of horns, and wherein the near field communication module comprises a support element that is made of an electrically non-conductive material, closes the through opening, and comprises an external face that defines a portion of an exterior surface of the case.

* * * * *